United States Patent
Bhandarkar et al.

(10) Patent No.: US 10,491,131 B2
(45) Date of Patent: Nov. 26, 2019

(54) DIGITAL CONTROL OF SWITCHED BOUNDARY MODE POWER CONVERTER WITHOUT CURRENT SENSOR

(71) Applicant: Microchip Technology Incorporated, Chandler, AZ (US)

(72) Inventors: Santosh Manjunath Bhandarkar, Chandler, AZ (US); Alex Dumais, Gilbert, AZ (US)

(73) Assignee: Microchip Technology Limited, Chandler, AZ (US)

( * ) Notice: Subject to any disclaimer, the term of this patent is extended or adjusted under 35 U.S.C. 154(b) by 0 days.

(21) Appl. No.: 16/052,208

(22) Filed: Aug. 1, 2018

(65) Prior Publication Data

US 2019/0052179 A1 Feb. 14, 2019

Related U.S. Application Data

(60) Provisional application No. 62/543,225, filed on Aug. 9, 2017.

(51) Int. Cl.
*H02M 3/335* (2006.01)
*H02M 3/158* (2006.01)
(Continued)

(52) U.S. Cl.
CPC ..... *H02M 3/33592* (2013.01); *H02M 1/4225* (2013.01); *H02M 3/158* (2013.01);
(Continued)

(58) Field of Classification Search
USPC .............. 323/210, 271; 363/21.01–21.18, 84
See application file for complete search history.

(56) References Cited

U.S. PATENT DOCUMENTS 6,448,745 B1   9/2002   Killat .......................... 323/222
8,098,505 B1   1/2012   Choi ............................. 363/89
(Continued)

FOREIGN PATENT DOCUMENTS

WO   2006/029323 A2   3/2006   ............... H02H 3/20

OTHER PUBLICATIONS

International Search Report and Written Opinion, Application No. PCT/US2018/045479, 12 pages, dated Oct. 19, 2018.
(Continued)

*Primary Examiner* — Yemane Mehari
(74) *Attorney, Agent, or Firm* — Slayden Grubert Beard PLLC (57) ABSTRACT

A circuit arrangement for switched boundary mode power conversion, a corresponding signal processor and a method of switched boundary mode power conversion are provided. The circuit arrangement comprises an input for receiving an input voltage from a power supply, an output to provide an output voltage to a load, an energy storage device, a controllable switching device, and a signal processor. The signal processor is connected to the controllable switching device and being configured for zero-current switching of the switching device, wherein the signal processor is further configured to determine at least one switching point for the zero-current switching from a first voltage signal and a second voltage signal, wherein the first voltage signal corresponds to the input voltage and the second voltage signal corresponds to the output voltage.

19 Claims, 7 Drawing Sheets

(51) Int. Cl.
 *H02M 1/42* (2007.01)
 *H02M 3/156* (2006.01)
 *H02M 3/157* (2006.01)
 *H02M 1/00* (2006.01)
(52) U.S. Cl.
 CPC .......... *H02M 3/1563* (2013.01); *H02M 3/157* (2013.01); *H02M 2001/0009* (2013.01)

(56) References Cited

U.S. PATENT DOCUMENTS

| | | | |
|---|---|---|---|
| 8,406,021 B2 | 3/2013 | Green | 363/89 |
| 8,901,901 B2 | 12/2014 | Ziegler et al. | 323/271 |
| 9,240,712 B2 | 1/2016 | Chandrasekaran | |
| 9,973,089 B1 | 5/2018 | Terasawa et al. | |
| 10,164,521 B2 | 12/2018 | Castelli | |
| 2005/0018458 A1 | 1/2005 | Shimada et al. | 363/125 |
| 2006/0077604 A1 | 4/2006 | Jansen | 361/90 |
| 2008/0205103 A1* | 8/2008 | Sutardja | G05F 1/70 363/84 |
| 2008/0246444 A1 | 10/2008 | Shao et al. | 323/207 |
| 2009/0206805 A1* | 8/2009 | Choi | H02M 3/1584 323/271 |
| 2009/0257257 A1 | 10/2009 | Adragna et al. | 363/65 |
| 2009/0267658 A1 | 10/2009 | Bridge et al. | 327/141 |
| 2010/0097828 A1 | 4/2010 | Chen | 363/72 |
| 2010/0165683 A1 | 7/2010 | Sugawara | 363/126 |
| 2010/0244789 A1 | 9/2010 | Osaka | 323/271 |
| 2011/0110134 A1 | 5/2011 | Gaboury et al. | 363/126 |
| 2011/0149622 A1 | 6/2011 | Lin | 363/124 |
| 2012/0092905 A1 | 4/2012 | Srighakollapu et al. | 363/37 |
| 2012/0224401 A1 | 9/2012 | Phadke | 363/84 |
| 2012/0244789 A1 | 9/2012 | Sheu | 451/388 |
| 2012/0262958 A1 | 10/2012 | Feldtkeller et al. | 363/44 |
| 2014/0103861 A1 | 4/2014 | Carletti et al. | 320/107 |
| 2014/0176089 A1 | 6/2014 | Yang et al. | 323/207 |
| 2014/0334196 A1 | 11/2014 | Chen et al. | 363/21.04 |
| 2014/0362614 A1 | 12/2014 | Koga | 363/21.17 |
| 2015/0146458 A1 | 5/2015 | Lim | 363/44 |
| 2016/0105096 A1* | 4/2016 | Chen | H02M 1/4225 323/210 |
| 2016/0276924 A1 | 9/2016 | Castelli et al. | 363/21.13 |
| 2018/0020515 A1* | 1/2018 | Rutgers | H05B 33/0815 |
| 2018/0109191 A1* | 4/2018 | Chan | H02M 3/1582 323/259 |
| 2019/0052179 A1 | 2/2019 | Bhandarkar et al. | |

OTHER PUBLICATIONS

Morroni, Jeffrey et al., "Design and Implementation of an Adaptive Tuning System Based on Desired Phase Margin for Digitally Controlled DC-DC Converters," IEEE Transactions on Power Electronics, vol. 24, No. 2, pp. 559-564, Feb. 1, 2009.

Juang, Kai-Cheung et al., "A Grid-Tied Flyback-Based PV Inverter with BCM Variable Frequency Voltage Mode Control," IEEE International Symposium on Intelligent Signal Processing and Communication Systems, pp. 598-603, Nov. 4, 2012.

Ryan, Robert T. et al., "Digital Control of an Interleaved BCM Boost PFC Converter with Fast Transient Response at Low Input Voltage," IEEE Energy Conversion Congress and Exposition, pp. 257-264, Oct. 1, 2017.

U.S. Non-Final Office Action, U.S. Appl. No. 16/051,872, 14 pages, dated Dec. 28, 2018.

International Search Report and Written Opinion, Application No. PCT/US2018/056989, 17 pages, dated Jan. 31, 2019.

International Search Report and Written Opinion, Application No. PCT/US2018/045492, 10 pages, dated Nov. 7, 2018.

International Search Report and Written Opinion, Application No. PCT/US2018/045485, 10 pages, dated Nov. 27, 2018.

U.S. Non-Final Office Action, U.S. Appl. No. 16/052,026 29 pages, dated Apr. 4, 2019.

U.S. Non-Final Office Action, U.S. Appl. No. 16/165,384 19 pages, dated Apr. 8, 2019.

U.S. Final Office Action, U.S. Appl. No. 16/051,872, 23 pages, dated Jun. 26, 2019.

* cited by examiner

DIGITAL CONTROL OF SWITCHED BOUNDARY MODE POWER CONVERTER WITHOUT CURRENT SENSOR

RELATED PATENT APPLICATION

This application claims priority to U.S. Provisional Patent Application No. 62/543,225 filed Aug. 9, 2017, the entire contents of which are hereby incorporated by reference for all purposes.

TECHNICAL FIELD

The present disclosure relates to power converters and, more particularly, to control of a boundary mode power converter.

BACKGROUND

Power converters and in particular switched-mode power converters are used in a variety of applications to provide AC/DC and DC/DC conversion. For example, switched-mode power converters, also referred to as switched-mode power supplies (SMPS), are widely used in computer and mobile phone power supply units to provide the necessary operating voltages from typical 120V/240V AC mains lines.

Typical items of concern when designing power converters relate to conversion efficiency and cost. It should be readily apparent that power losses should be minimized to increase the overall efficiency of the converter and also to reduce the generation of heat, which may be difficult to dissipate depending on the design and the respective application.

It is known to operate switched-mode power converters in boundary conduction mode or short "boundary mode" (BCM). Unlike a continuous operation in CCM (continuous conduction mode), in boundary conduction mode it is aimed to operate the switch of the power converter when no or no substantial current flows through the switch. This operational mode reduces switching losses and also allows to use less expensive components, for example less expensive boost diodes in a boost switched-mode power converter setup due to no reverse-recovery losses. In addition, BCM also allows for power factor correction (PFC), in view that the input current follows the input voltage waveform.

A by-product of BCM is that the converter inherently uses a variable switching frequency. The frequency depends primarily on the selected output voltage, the instantaneous value of the input voltage, the parameters of the energy storage used, e.g., inductance or capacitance and the output power delivered to the load. The lowest frequency occurs at the peak of sinusoidal line voltage.

To operate properly in boundary conduction mode, it is necessary to determine the exact moment when the current through the switch reaches zero. In typical circuits, current sensing is used, for example using a current transformer, using a coupled inductance, such as a further winding close to a main inductance, or using CT or hall effect sensors. However, all of these approaches add cost and complexity to the circuit.

SUMMARY

An object thus exists to provide a cost-effective circuit arrangement and method for switched-mode power conversion that allows to operate efficiently in boundary conduction mode.

The object is solved by a circuit arrangement, a signal processor, and a method for switched boundary mode power conversion. The dependent claims as well as the following description contain various embodiments of the invention.

In one aspect, a circuit arrangement for switched boundary mode power conversion is provided that comprises an input for receiving an input voltage from a power supply; an output to provide an output voltage to a load; an energy storage device; a controllable switching device; and a signal processor. The signal processor is connected to the controllable switching device and is configured for zero-current switching of the switching device; wherein the signal processor is further configured to determine at least one switching point for the zero-current switching from a first voltage signal and a second voltage signal, wherein the first voltage signal corresponds to the input voltage and the second voltage signal corresponds to the output voltage.

A basic idea of the invention is to allow operating a switched-mode power converter efficiently in boundary conduction mode by eliminating current sensing. This allows to reduce the cost of a corresponding converter. As the inventors of the instant invention have ascertained, eliminating current sensing in boundary conduction mode converters also removes problems with the detection, since the use of magnetic components for the current sensing introduces a significant delay. The delay makes a proper detection of a zero-current point difficult. At last, some embodiments allow an increased power density, i.e., a smaller converter size.

BRIEF DESCRIPTION OF THE DRAWINGS

The above and other objects, features, and advantages of the current invention will become apparent from the following discussion of various embodiments. In the FIGS.

DETAILED DESCRIPTION

Technical features described in this application can be used to construct various embodiments of integrated circuit devices. Some embodiments of the invention are discussed so as to enable one skilled in the art to make and use the invention.

As discussed in the preceding, and in one aspect, a circuit arrangement for switched boundary mode power conversion is provided that comprises an input for receiving an input voltage from a power supply; an output to provide an output voltage to a load; an energy storage device; a controllable switching device; and a signal processor. The signal processor is connected to the controllable switching device and is configured for zero-current switching of the switching device; wherein the signal processor is further configured to determine at least one switching point for the zero-current switching from a first voltage signal and a second voltage signal, wherein the first voltage signal corresponds to the input voltage and the second voltage signal corresponds to the output voltage.

In the context of the present discussion, the term "switched boundary mode power conversion" is understood as switched-mode electric power conversion in boundary conduction mode (BCM). A corresponding converter circuit comprises at least an energy storage device and a switching device for storing input energy temporarily and then releasing that energy to the output at a different voltage.

In BCM, a new switching period is initiated when the current through the energy storage device returns to zero, which is at the boundary of continuous conduction (CCM) and discontinuous conduction mode (DCM).

An "energy storage device" in the present context is understood as a device for storing electrical energy at least temporarily. For example, an energy storage device may comprise one or more inductors/inductances and/or one or more capacitors/capacitances.

In some embodiments, the value of the energy storage device such as an inductor should be large in comparison to the total resistance in the circuit. The resistance (R) could be present in the form of inductor resistance, switching device resistance, filter resistance, board trace resistance, etc. The inductor current in some embodiments follows a path based on the final value of current during ON time as $If*e^{(-t/\zeta)}$ where $If=Vin/R$, $\zeta=L/R$. The inductor current appears as a straight line if $\zeta$ is large. One way to increase the value of $\zeta$ is to reduce the resistance (R) value by using efficient switches and inductors. During the OFF time, the load resistance contributes to R in addition to other resistances. The value of L may be set in some embodiments by the input voltage, load range, and switching frequency limits.

The switching device in the present context may be of any suitable type to control an electrical current. The switching device may comprise for example one or more semiconductor switches, such as bipolar transistors, field-effect transistors, MOSFETs, IGBTs, SiCs, GANs etc.

According to the present aspect, the circuit arrangement comprises the signal processor. In this context, a signal processor is understood as a device that allows for cycled controlling of the switching device, for example according to a pulse-width-modulation (PWM) with a frequency in the kHz range. In some examples, the signal processor is configured to control the switch in PWM with a frequency of approximately 500 kHz. In some embodiments, the signal processor is a digital signal processor (DSP), which allows faster execution of routines for zero-current determination.

The signal processor according to the present aspect is configured for zero-current switching. In this context, "zero-current switching" is understood as controlling the switching device when no or just a minor current of, e.g., less than 100 μA is flowing. As will be apparent in view that the circuit arrangement is configured for boundary conduction mode operation, zero-current switching in particular relates to the control from an off state, i.e., non-conductive state of the switching device, to an on state, i.e., a conductive state of the switching device when no or just a minor current is flowing.

A "zero-current point" of the energy storage device in the context of the present explanation is understood as the point in time when the energy storage device is completely discharged after a charge/discharge cycle, also referred to as "switching cycle" herein.

A "switching cycle" in this context is understood as the combined time of the respective controllable switching device being set conductive, i.e., in the on-state, and the controllable switching device subsequently being set non-conductive, i.e., in the off-state. In case of a PWM control, the switching cycle corresponds to the PWM cycle time T.

A "mid-cycle" time corresponds to half the switching cycle period and is thus a point in time in each switching cycle that is equally spaced between two subsequent zero-current points of the energy storage device.

Reference will now be made to the drawings in which the various elements of embodiments will be given numerical designations and in which further embodiments will be discussed.

Specific references to components, modules, units, devices, sections, parts, process steps, and other elements are not intended to be limiting. Further, it is understood that like parts bear the same or similar reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
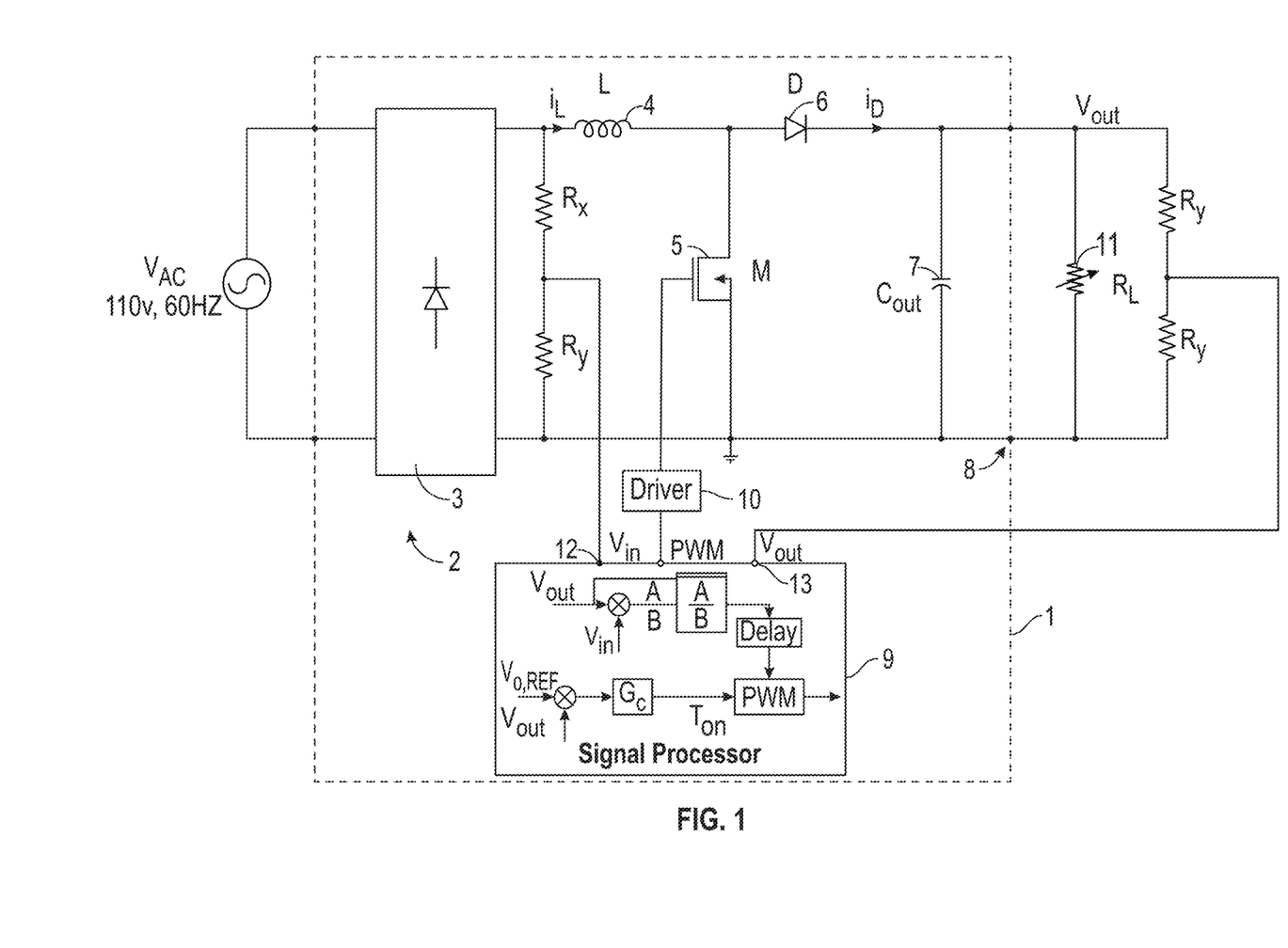
FIG. 1 shows a schematic block diagram of an embodiment of a circuit arrangement for switched boundary mode power conversion.

FIG. 1 shows a schematic block diagram of an embodiment of a circuit arrangement for switched boundary mode power conversion, namely in the instant embodiment, a switched-mode BCM boost converter circuit 1.

The boost converter circuit 1 comprises an input or input stage 2, configured for connection to a typical mains connection, e.g., at 110V, 60 Hz or 240V, 50 Hz. A bridge rectifier 3 is provided at the input 2 to obtain positive half-waves. The boost converter circuit 1 further comprises an energy storage device in the form of an inductor 4, MOSFET switching device 5, flyback diode 6, output capacitor 7, output 8, signal processor 9, and pulse-width-modulation (PWM) driver 10.

The general operation of circuit 1 corresponds to that of a typical boost converter: inductor 4 is charged when MOSFET 5 is in the on state. Once inductor 4 is charged, MOSFET 5 is switched to the off state, so that the only remaining current path is through the flyback diode 6 and load 11, the latter of which is shown in FIG. 1 as a variable resistance. The voltage increases in view of the increased current from both, the inductance 4 and the input 2. The energy stored in the inductor 4 during the on state is discharged into the load 11 through diode 6, when the MOSFET 5 is in the off state.

The operation of circuit 1 is controlled by signal processor 9 and PWM driver 10. As shown, signal processor 9 is connected to PWM driver 10 and provides a PWM control signal to the driver 10. The driver 10 controls the MOSFET 5 and comprises a level shifter, which changes the drive signal from 0-3.3V to the levels required by MOSFET 5, e.g., in this embodiment 0-12V. Additionally, PWM driver 10 drives the MOSFET 5 with a faster rise and fall times, which are beneficial for reducing switching losses. The MOSFET ON voltage decides its resistance. Higher voltage leads to lower ON resistance.

The signal processor 9 in the present embodiment is a digital signal processor of dsPIC33EP series type, available from Microchip Technology Inc., Chandler, Ariz., USA. As discussed in the preceding, the circuit 1 is configured for boundary conduction mode (BCM) operation, which is controlled by signal processor 9.

Figure 2:
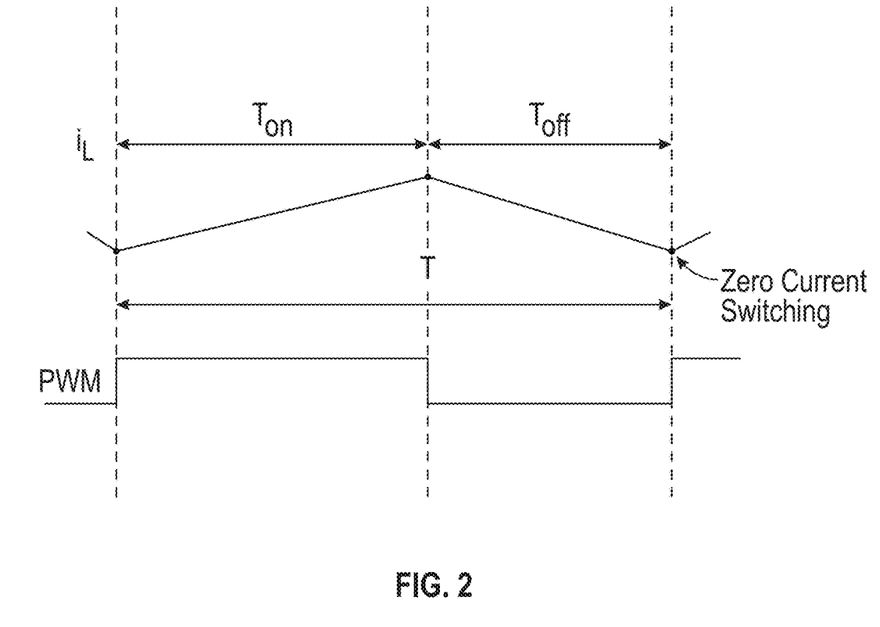
FIG. 2 shows a diagram of the inductor current $I_L$ in an exemplary schematic PWM switching cycle.

In typical BCM operation, a new switching period of the PWM is initiated when the current through the inductor 4, $I_L$, returns to zero. FIG. 2 shows a diagram of the inductor current $I_L$ in an exemplary schematic PWM switching cycle.

The rising current slope typically may correspond to $V_{IN}/L$ and the falling current slope may typically correspond to $$\frac{(V_{IN} - V_{OUT})}{L}.$$

As can be seen from the bottom part of FIG. 2, a PWM control signal is applied to MOSFET 5. When the PWM signal is high, MOSFET 5 is conductive and the current $I_L$ in the inductor 4 increases. This time period is described herein as $T_{ON}$ time. Once the desired charge of inductor 4 is reached, the PWM signal is controlled to low and MOSFET 5 is set non-conductive. The current $I_L$ gradually decreases until the inductor 4 is fully discharged. This time period is described herein as $T_{OFF}$ time. Both, $T_{ON}$ and $T_{OFF}$ are a PWM/switching cycle T.

When the inductor 4 is fully discharged, i.e., at a "zero-current point" in time in the PWM cycle, the next PWM cycle begins. The PWM signal correspondingly is controlled high and MOSFET 5 is switched conductive.

As discussed in the preceding, BCM avoids switching losses in view that the MOSFET 5 is controlled from an off-state to an on-state when no substantial current flows, which is referred to herein as "zero-current switching".

Figure 3:
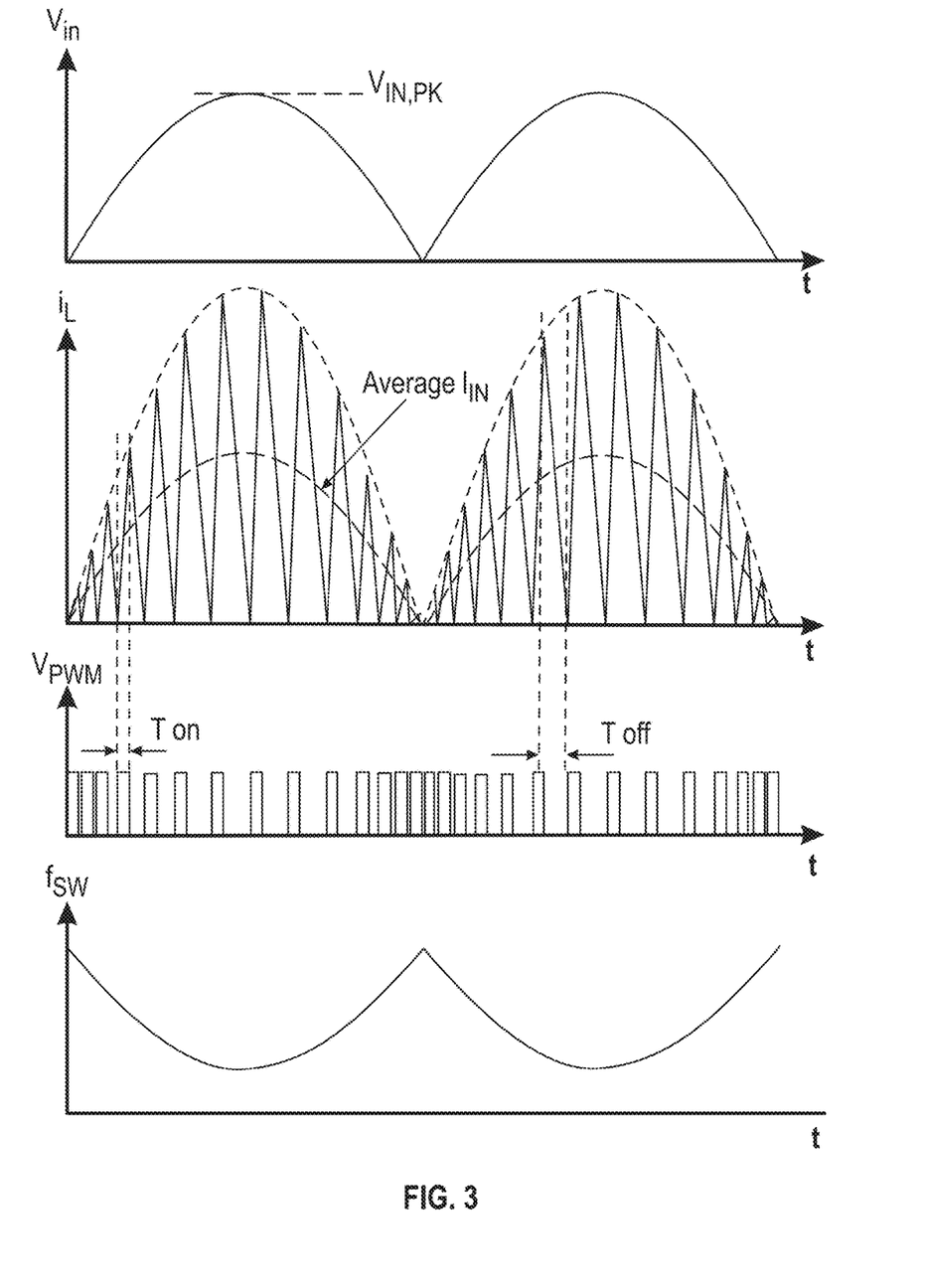
FIG. 3 shows diagrams of the operation of the circuit arrangement of the embodiment of FIG. 1 during a full cycle of AC input voltage $V_{IN}$.

FIG. 3 shows diagrams of the operation of the circuit 1 during a full cycle of AC input voltage $V_{IN}$. As will be apparent from the FIG., the inductor 4 is charged and discharged multiple times in each half-cycle of the input voltage in accordance with the PWM signal, shown in FIG. 3 as $V_{PWM}$. The converter circuit 1 operates with a variable switching frequency, which depends primarily on the desired output reference voltage $V_{O,ref}$, the instantaneous value of the input voltage $V_{IN}$, the inductor value of inductor 4, and the output power delivered to the load $R_L$ 11.

The operating frequency changes as the input current follows the sinusoidal input voltage waveform, as shown in FIG. 3. The lowest frequency occurs at the peak of sinusoidal input, i.e., line voltage. As will be apparent from FIG. 3, and since the current waveform of $I_L$ is roughly triangular, the average value in each PWM period is proportional to the input voltage $V_{IN}$. Thus, provided a sinusoidal $V_{IN}$, the input current $I_{IN}$ of the circuit 1 follows the waveform of $V_{IN}$ with high accuracy and draws a sinusoidal input current from the mains. Accordingly, operating the converter 1 in BCM is ideal for power factor correction (PFC).

Reverting to FIG. 1, to allow BCM operation, the signal processor 9 is configured to receive a first voltage signal that corresponds to the rectified mains voltage $V_{IN}$ at a first voltage input 12. A second voltage signal is provided to second voltage input 13. The second voltage signal corresponds to the output voltage $V_{OUT}$. Both voltage signals in the embodiment of FIG. 1 are obtained over corresponding voltage dividers, formed by resistors $R_x$ and $R_y$. It is noted that while the output-side voltage divider in FIG. 1 is shown outside of circuit arrangement 1, certainly, this voltage divider may be provided as a part of the circuit arrangement 1.

The signal processor 9 takes samples of the first voltage signal and the second voltage signal. The sampling of the input and output voltage signal should be done ideally at T/2, i.e., at half of a switching cycle for obtaining suitable averages.

Signal processor 9 is configured to sample the voltage signals at T/2 when the duty cycle of the PWM is lower than 50%, i.e., when $V_{IN} > V_{OUT}/2$. This provides that the period corresponds to the average of the input voltage. The bulk of the power transfer occurs during this interval. Since the duty cycle and the frequency are low in this case, there is adequate time for calculating the next zero-current point and the switching period.

For the remainder of the input voltage half-wave, the sampling frequency goes higher towards the zero-current point and there is no adequate time for computation if sampling would be done at T/2. Instead, for a duty cycle of equal to or higher than 50%, the signal processor 9 is configured to sample the voltage signals near the start of the cycle, for example after a small delay of 100 ns for switching transients to die down. Since the input voltage is small compared to its peak, the difference between the values sampled at start and T/2 is not significant.

Using the two voltage signals, corresponding to $V_{IN}$ and $V_{OUT}$, as well as a predefined voltage reference $V_{O,REF}$, provided by an internal memory (not shown) of signal processor 9, the signal processor 9 calculates the zero-current points in each PWM cycle, i.e., the point in time, where the inductor current $I_L$ reaches zero. It is noted, that signal processor 9 in this embodiment does not measure the inductor current $I_L$ directly, which provides a particularly cost effective and compact setup.

Figure 4:
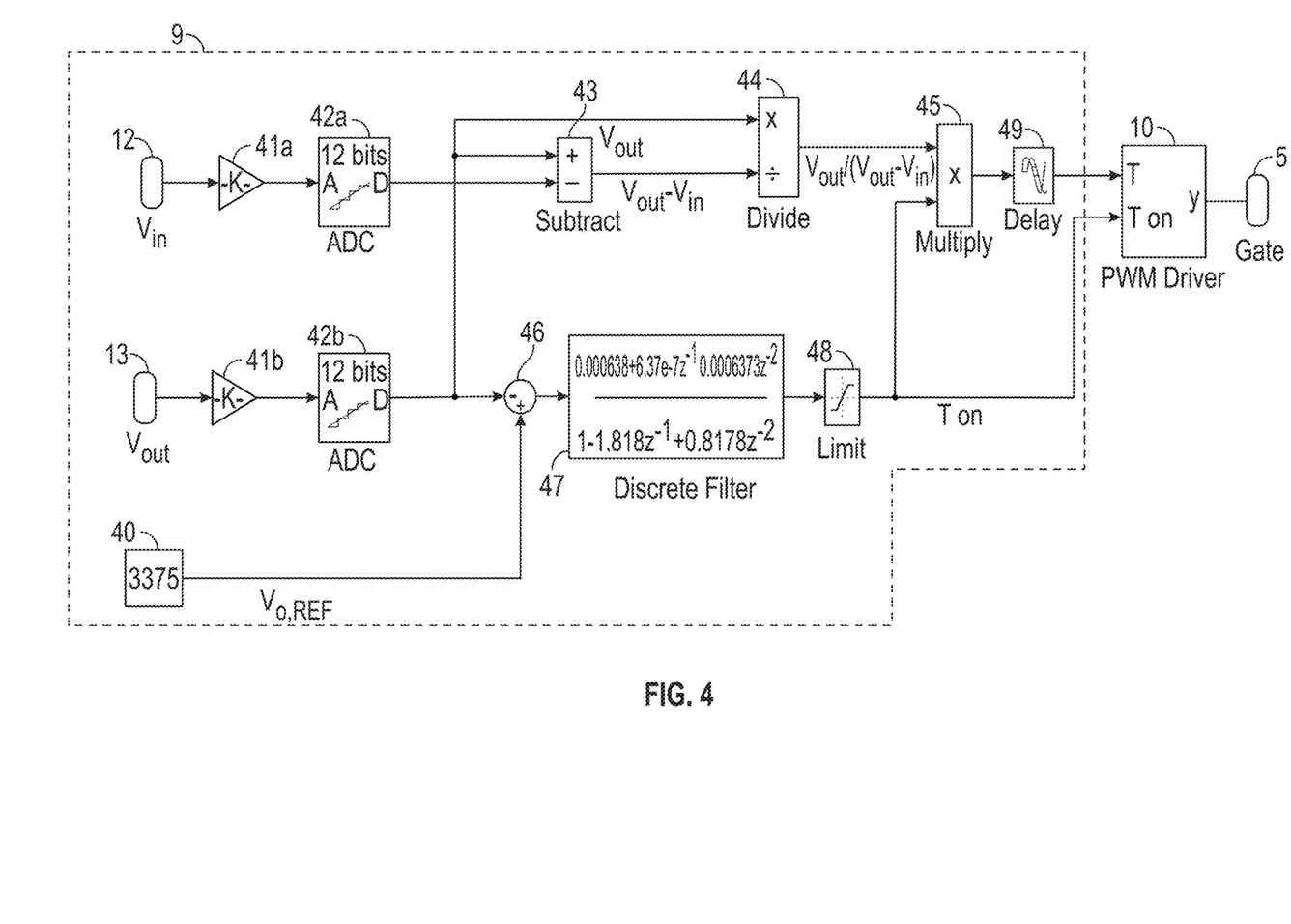
FIG. 4 shows a schematic block diagram of an embodiment of the operation of signal processor 9 of FIG. 1.

FIG. 4 shows a schematic block diagram of an embodiment of the operation of signal processor 9 of FIG. 1.

The first (corresponding to $V_{IN}$) and second (corr. to $V_{OUT}$) voltage signals are received at the respective inputs 12 and 13. The predefined voltage reference $V_{O,REF}$ is obtained from memory 40. The two voltage signals are provided to operational amplifiers 41a, 41b for signal conditioning and then provided to analog-to-digital (ADC) circuits 42a, 42b. The two ADC circuits 42a, 42b convert the voltage signals to digital information and are of 12 bit type with a Vmin: 0V and a Vmax: 3.3V.

Signal processor 9 further comprises multiple modules to provide the total PWM cycle time T and the on-time $T_{ON}$ to PWM driver 10. As shown in the upper part of FIG. 4, subtraction module 43 and division module 44 provide $$\frac{V_{OUT}}{(V_{OUT} - V_{IN})}$$

to multiplication module 45. The upper path, shown in FIG. 4, is a high frequency execution path to compute the PWM period value, operating at a maximum frequency in this embodiment of 500 kHz.

In the lower part of FIG. 4, the on-time for the PWM, $T_{ON}$, is calculated from $V_{OUT}$, i.e., the current output voltage and the predefined voltage reference $V_{O,REF}$. Summing node 46 compares the current output voltage $V_{OUT}$ with the "set point" $V_{O,REF}$. The resulting error signal is provided to filter/compensator 47, which runs at a relatively low frequency, e.g., 10 Hz, to remove second harmonic components, typically present in the output voltage $V_{OUT}$.

The filtered error signal is provided to limiter 48. The limiter 48 provides safety, in particular in a load side short circuit situation. During a short circuit on the output/load side, the ON time of MOSFET 5 tends to go higher. Limiter 48 limits the maximum on time $T_{ON}$, and thus the maximum power, fed to the output. Accordingly, a short circuit situation is safely handled. If both, the input voltage and the on-time are within limits, an over power condition does not arise.

Multiplier 45 receives the correspondingly processed error signal as on-time $T_{ON}$ and correspondingly provides $$\frac{V_{OUT}}{(V_{OUT} - V_{IN})} \times T_{ON}$$

to delay 49 and subsequently to PWM driver 10 as total PWM period time T. $T_{ON}$ also directly provided to PWM driver 10. Using T and $T_{ON}$, PWM driver can apply the appropriate PWM timing settings to the gate of MOSFET 5. In view that the calculation is based upon $V_{OUT}$ and $V_{IN}$, the zero-current point in each PWM cycle reliably determined.

As mentioned in the preceding, delay 49 is coupled between multiplier 45 and the PWM driver 10. The delay 49 provides to slightly delay the moment, the MOSFET 5 is switched to the on-state past the "true" moment, the current in inductor 4 reaches zero. The reason being that considering typical parasitic capacitances, in particular in MOSFET 5, the actual zero moment of the inductor 4 is not ideal for the switching in view the voltage across the parasitic capacitance of MOSFET 5 in this case would discharge through the MOSFET 5. To counter this loss, delay 49 is provided. Delay 49 further compensates a propagation delay, introduced by the driver 10. The delay time is predefined, based on the parasitic capacitance value. Typical delay times range between 100 ns and 500 ns. Accordingly, it is noted that in view of the rather small delay introduced in the switching of MOSFET 5, the delayed switching points are still considered as zero-current points herein.

Figure 5:
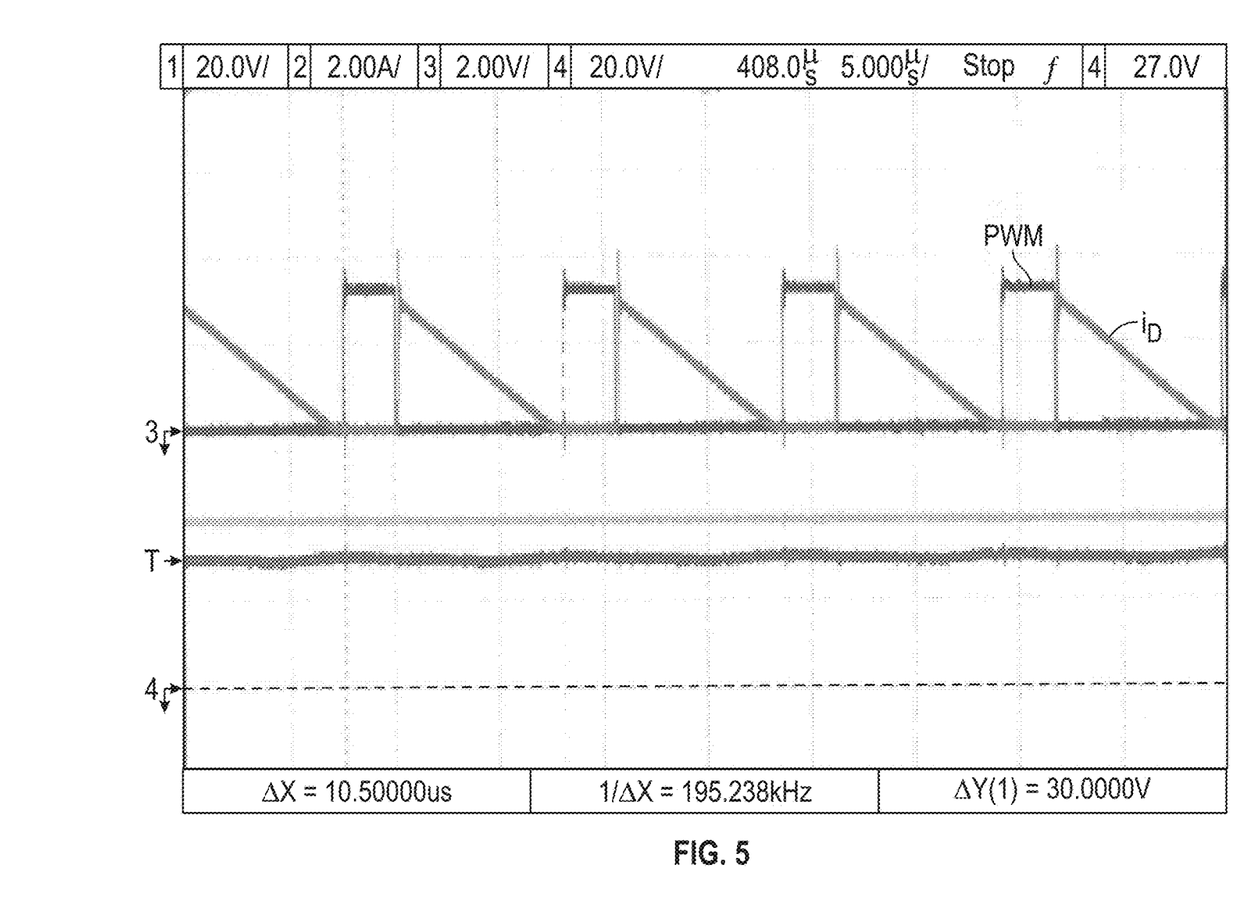
FIGS. 5 to 6 show waveforms of the operation of the circuit arrangement of the embodiment of FIG. 1.
Figure 6:
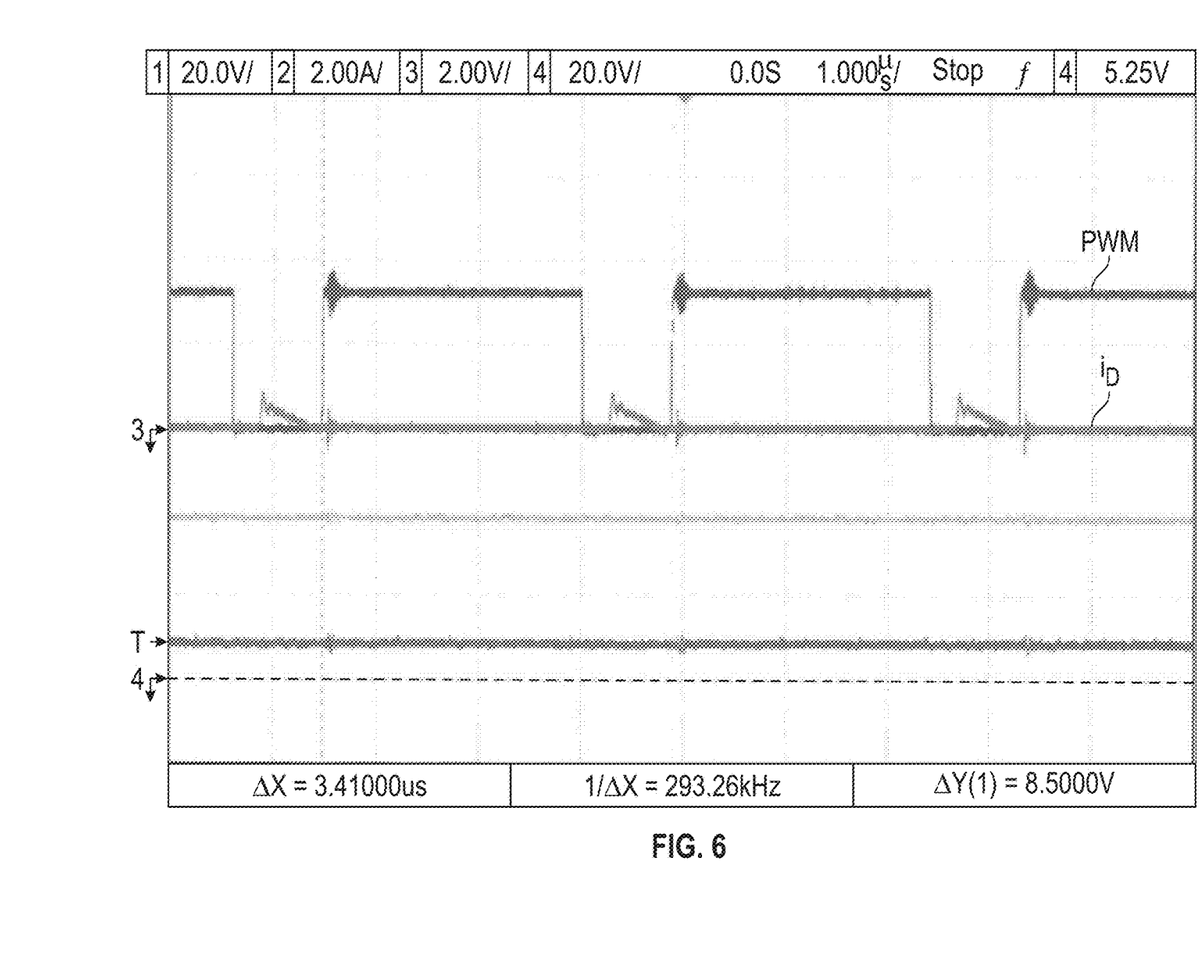

FIG. 5 shows the diode current $i_D$ near the peak of the input voltage. FIG. 6 shows the diode current $i_D$ near zero of the input voltage.

Figure 7:
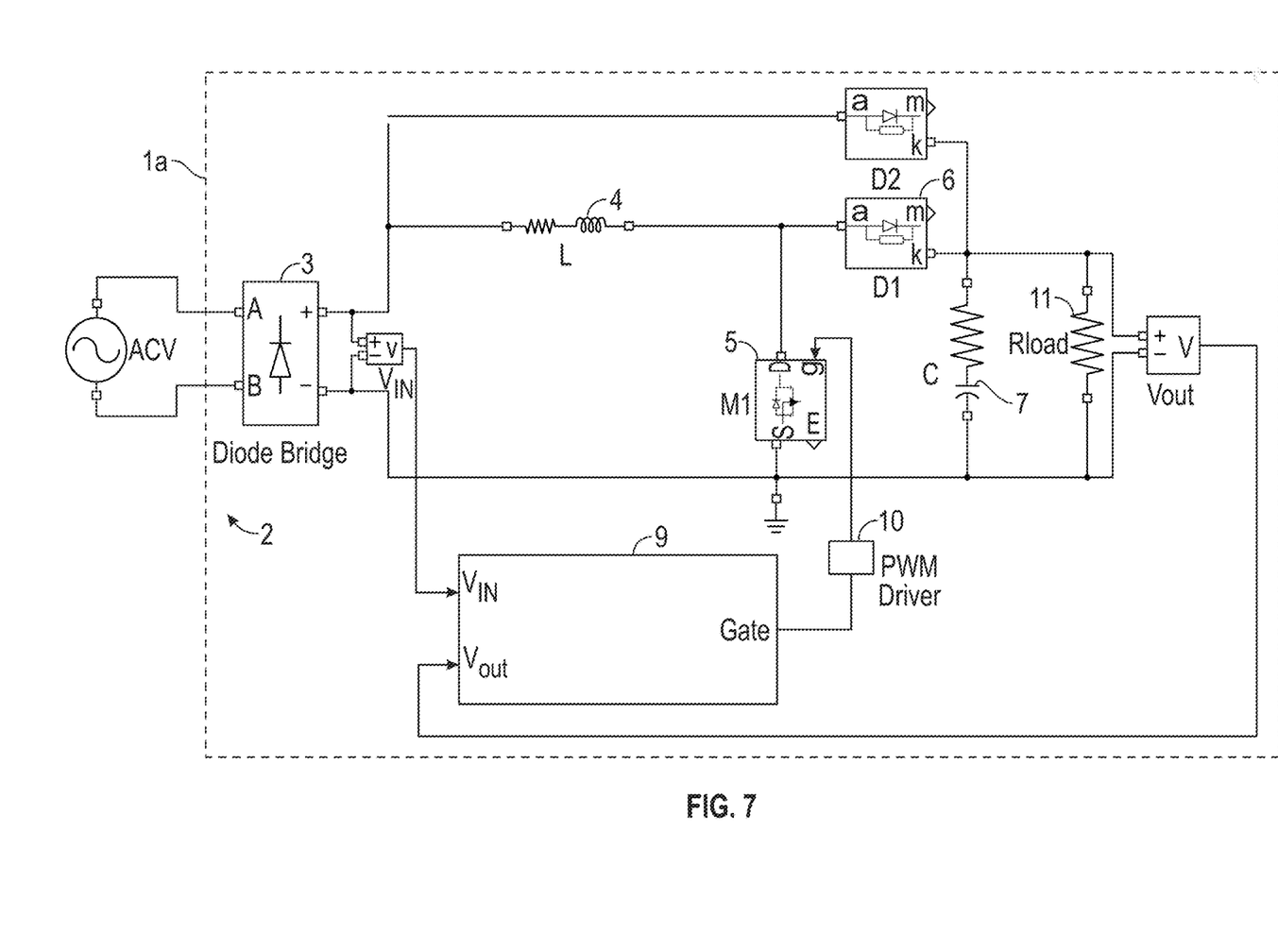
FIG. 7 shows a further embodiment of a boost converter circuit 1a in a schematic block diagram.

FIG. 7 shows a further embodiment of a boost converter circuit 1a in a schematic block diagram. The embodiment of circuit arrangement 1a corresponds to the embodiment of FIG. 1 with the following exception. As can be seen from FIG. 7, a bypass diode D2 for the inductor 4 is arranged, which is facilitates starting up the circuit 1a.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:

- instead of or in addition to inductor 4, a capacitor is used as an energy storage device;
- an EMI (electromagnetic interference) filter is included and designed to pass lower frequency components and attenuate the higher frequency components; and/or
- filter/compensator 47 is a 2P2Z or a PID controller;

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit may fulfill the functions of several items recited in the claims.

The mere fact that certain measures are recited in mutually different dependent claims does not indicate that a combination of these measured cannot be used to advantage. Any reference signs in the claims should not be construed as limiting the scope.

APPENDIX

Embodiments of the present disclosure include microcontrollers, systems, integrated circuit devices, and methods for digital control of boundary mode PFC without a current sensor. Such PFC may be implemented by any suitable combination of analog circuitry, digital circuitry, instructions for execution by a processor, or combination thereof. Embodiments of the present disclosure may further be implemented in power supplies or controllers for power supplies.

FIG. 1 is an illustration of an example circuit for implementing control of boundary mode PFC without current sensor.

Boundary mode PFC may include a variable frequency topology wherein the switching frequency is varying over an alternating current (AC) line cycle. The variable frequency may be due to zero-inductor-current PWM switching. The frequency may be primarily dependent on the input voltage, output load, and inductor value. The frequency may be highest near the input voltage zero and lowest near the input voltage peak. An EMI filter may be included and designed to pass lower frequency components and attenuate the higher frequency components.

Boundary mode PFC may also include a boost topology, AC input, direct current (DC) output, an outer voltage loop, constant ON time, a switch to be turned off at zero current, and variable frequency.

Embodiments of the present disclosure may interleave two or more boost PFC stages. The embodiments may achieve both zero current switching and 50% phase difference. Implementations of such embodiments and algorithms thereof may cause significant amounts of delay in the current detection circuitry. Such delay may arise from a mismatch between calculated and actual zero detection time. One solution to this issue may require complex magnetic design changes. Another solution may include embodiments wherein current detection is eliminated. The current detection may be eliminated for the PFC stages or for boundary mode PFC. Boundary mode PFC may achieve high power factor and high efficiency due to zero current switching in a front-end AC-DC converter. However, boundary mode PFC may otherwise require complicated current sensing either using a current transformer or zero current sensing using coupled inductor technique. Instead, embodiments of the present disclosure may take advantage of the computing power of an integrated circuit device that otherwise is responsible for PFC, such as a microcontroller, ASIC, or dsPIC, to achieve the advantages of the boundary mode PFC, without the use of any current sensors. The proposed solution may lead to a solution having low cost and higher power density.

In FIG. 1, in an interleaved multistage boundary mode PFC, boundary mode PFC may be achieved wherein the current is switched at zero instance. This may lead to higher efficiency due to lower switching losses. The input to the circuit is a power supply at, for example, 110V, 60 Hz or 230V, 50 Hz. The input voltage may be rectified using a bridge rectifier and fed to a boost circuit including an inductor, switch and diode. The rectified input voltage and the output voltage may be sampled by an analog-to-digital converter (ADC). The ADC may be inherent in the dsPIC. Other solutions may rely on either inductor current sensing using a CT or hall effect sensor or zero cross detection circuits utilizing coupled inductance. However, these circuits add additional cost to the hardware. Further there is a significant amount of delay in the circuits due to reliance on the magnetic components for detection. The dsPIC may run a compensator such 2P2Z or PID for the voltage loop at a relatively low frequency to obtain the $T_{ON}$ time. The output of the compensator may provide the ON time for the pulsed-width modulation (PWM) circuit. A higher bandwidth loop may compute the PWM period value based on the values of input and output voltages. The PWM may truncate at the instant the current goes to zero. In reality, a zero current point may not be not ideal for the switching as the voltage across parasitic capacitance of the switch (implemented as, for example, a MOSFET) would discharge through the switch. This may lead to additional power losses in the switch. To counter this loss, a delay may be added to the switch depending on the parasitic capacitance value. Thus, embodiments of the present disclosure may meet the objective of zero current switching without current sensing. The risk of not having a current sense circuit is felt during conditions such as load short circuit. During short circuit the output voltage falls low, and the ON time of the switch tends to go higher. By setting the maximum ON time of the switch, a condition such as overload or short circuit may be addressed, as the power fed to the output is limited. The input current may depend on the value of the ON time and input voltage. If both the input voltage and ON time are within limits, over power conditions might not arise. The input voltage is monitored separately and a fault is flagged if it is outside the working range.

Most system designers and developers would resist the concept of removing current sensing from such a circuits due to perception of reduced safety. However, embodiments of the present disclosure may still handle safety conditions and requirements under all necessary load conditions. Furthermore, the topology of embodiments of the present disclosure under consideration may require a significant amount of MIPS to compute and estimate the current zero crossing time, considering the variable frequency operation of the PFC. This may cause a need for significant expertise in implementing the solutions.

Embodiments of the present disclosure may eliminate the need for complicated current sensing circuitry thereby reducing the size of the power supply. Further it also reduces the need for additional pins and processing of the current signal using a microcontroller.

FIGS. 2 and 3 illustrate example performance of the system in terms of current with respect to time periods and a PWM signal.

FIG. 4 is an illustration of an algorithm of operation of the PFC, according to embodiments of the present disclosure.

FIG. 5 illustrates inductor current near peak, according to embodiments of the present disclosure.

FIG. 6 illustrates inductor current near zero, according to embodiments of the present disclosure.

FIG. 7 is another illustration of a block diagram of a PFC power supply, according to embodiments of the present disclosure.

Although particular embodiments have been illustrated in the present disclosure, additions, modifications, subtractions, and other alterations may be made to the example embodiments of the present disclosure without departing from the spirit and teachings of the present disclosure.

An integrated circuit device, may comprise a control circuit; and a plurality of boost converter stages, each boost converter stage including an inductor, a diode, and a switch; wherein the control circuit is configured to synchronize a new pulsed-width modulation (PWM) switching cycle upon a zero-inductor current through respective boost converter stages.

What is claimed is:

1. A circuit arrangement for switched boundary mode power conversion, comprising at least:

an input for receiving an input voltage from a power supply;
an output to provide an output voltage to a load;
an energy storage device;
a controllable switching device; and
a signal processor, connected to the controllable switching device and being configured for zero-current switching of the switching device; wherein
the signal processor is further configured to determine at least one switching point for the zero-current switching from a first voltage signal and a second voltage signal, wherein the first voltage signal corresponds to the input voltage and the second voltage signal corresponds to the output voltage; and wherein the signal processor comprises a delay module, configured so that the at least one switching point is delayed for a predetermined delay time after the energy storage device is completely discharged.

2. The circuit arrangement of claim 1, wherein the signal processor during zero-current switching is configured to control the switching device at least at one zero-current point of the energy storage device.

3. The circuit arrangement of claim 2, wherein the signal processor is configured to control the switching device from an off-state to an on-state at the at least one zero-current point.

4. The circuit arrangement of claim 1, wherein the signal processor is configured to recurrently control the switching device at zero-current points.

5. The circuit arrangement of claim 1, wherein the signal processor is configured for zero-current switching without current sensing.

6. The circuit arrangement of claims 1, wherein the signal processor is further configured to determine output voltage reference information and to determine the at least one switching point from the first voltage signal, the second voltage signal, and the output voltage reference information.

7. The circuit arrangement claim 1, wherein the signal processor comprises a PWM module for driving the switching device.

8. The circuit arrangement of claim 7, wherein the signal processor further comprises a limiter, configured to provide maximum on-time information to the PWM module.

9. The circuit arrangement of claim 1, wherein the signal processor is a digital signal processor comprising at least one analog-to-digital converter for converting at least one of the first or second voltage signal.

10. The circuit arrangement of claim 1, wherein the signal processor is configured to sample at least one of the first voltage signal and the second voltage signal at a sampling time in each switching cycle, wherein the sampling time depends on the input voltage.

11. The circuit arrangement of claim 10, wherein the signal processor is configured to set the sampling time to a mid-cycle time in case the input voltage is greater than half of the output voltage, which mid-cycle time is equally spaced between two subsequent zero-current points of the energy storage device.

12. The circuit arrangement of claim 10, wherein the signal processor is configured to set the sampling time substantially to a zero-current point in case the input voltage corresponds to or is less than half of the output voltage.

13. The circuit arrangement of claim 1, wherein the energy storage device is an inductor.

14. The circuit arrangement of claim 1, wherein the switching device is a MOSFET.

15. The circuit arrangement of claim 1, wherein the circuit arrangement is a boost converter.

16. The circuit arrangement of claim 1, further comprising a rectifier circuit to rectify an AC input voltage.

17. A signal processor for use in a circuit arrangement for switched boundary mode power conversion with at least a controllable switching device, said signal processor being connectable to the controllable switching device and being configured for zero-current switching of the switching device; wherein the signal processor is further configured to determine at least one switching point for the zero-current switching from a first voltage signal and a second voltage signal, wherein the first voltage signal corresponds to an input voltage and the second voltage signal corresponds to an output voltage; and wherein the signal processor comprises a delay module, configured so that the at least one switching point is delayed for a predetermined delay time after the energy storage device is completely discharged.

18. A method of switched boundary mode power conversion with a circuit comprising an input for receiving an input voltage from a power supply; an output to provide an output voltage to a load; and a controllable switching device; wherein at least one switching point for a zero-current control of the controllable switching device is determined from a first voltage signal and a second voltage signal, the first voltage signal corresponding to the input voltage and the second voltage signal corresponding to the output voltage; and wherein the switching device is controlled according to the determined at least one zero-current control switching point; and wherein the at least one switching point is delayed for a predetermined delay time after the energy storage device is completely discharged.

19. A machine-readable medium including contents that are configured to cause a signal processor to conduct the method of claim 18.

* * * * *

UNITED STATES PATENT AND TRADEMARK OFFICE
CERTIFICATE OF CORRECTION

PATENT NO. : 10,491,131 B2
APPLICATION NO. : 16/052208
DATED : November 26, 2019
INVENTOR(S) : Santosh Manjunath Bhandarkar et al.

It is certified that error appears in the above-identified patent and that said Letters Patent is hereby corrected as shown below:

On the Title Page

(73) Assignee: Microchip Technology Limited
---Change to--- Microchip Technology Incorporated

In the Claims

Column 10,
Claim 6, Line 1, "The circuit arrangement of claims 1..."
---Change to--- "The circuit arrangement of claim 1..."

Signed and Sealed this
Thirty-first Day of December, 2019

Andrei Iancu
*Director of the United States Patent and Trademark Office*